(12) United States Patent
Gao et al.

(10) Patent No.: US 7,936,109 B1
(45) Date of Patent: May 3, 2011

(54) NON-RESONANT ENERGY HARVESTING DEVICES AND METHODS

(75) Inventors: Ziyang Gao, Hong Kong (HK); Man Lung Sham, Hong Kong (HK); Xiang Chen, Hong Kong (HK)

(73) Assignee: Hong Kong Applied Science and Technology Research Institute Co. Ltd., Hong Kong (HK)

( * ) Notice: Subject to any disclaimer, the term of this patent is extended or adjusted under 35 U.S.C. 154(b) by 0 days.

(21) Appl. No.: 12/751,240

(22) Filed: Mar. 31, 2010

(51) Int. Cl.
*H01L 41/08* (2006.01)
(52) U.S. Cl. ........................... 310/329; 310/339
(58) Field of Classification Search .......... 310/329, 310/339
See application file for complete search history.

(56) References Cited

U.S. PATENT DOCUMENTS

| | | | | |
|---|---|---|---|---|
| 2,808,522 A | * | 10/1957 | Dranetz | 310/326 |
| 3,320,580 A | * | 5/1967 | Sykes | 367/157 |
| 4,346,597 A | * | 8/1982 | Cullen | 73/510 |
| 4,581,506 A | * | 4/1986 | Bai et al. | 200/61.45 R |
| 7,504,763 B2 | | 3/2009 | Haswell et al. | 310/339 |
| 7,579,757 B2 | * | 8/2009 | Kulah et al. | 310/339 |
| 7,667,375 B2 | | 2/2010 | Berkcan et al. | 310/339 |
| 7,667,376 B2 | | 2/2010 | Schmidt | 310/339 |
| 2007/0125176 A1 | | 6/2007 | Liu et al. | 73/649 |

FOREIGN PATENT DOCUMENTS

| | | |
|---|---|---|
| CN | 1702952 | 11/2005 |
| WO | WO 2008/099437 | 2/2008 |

* cited by examiner

*Primary Examiner* — Mark Budd
(74) *Attorney, Agent, or Firm* — Elle Cheong Hong Kong; Margaret Burke; Sam Yip

(57) ABSTRACT

Disclosed is an energy harvesting device which can produce electrical power from vibrational energy over a wide range of frequencies. The energy harvester includes a housing having opposing slots. A bendable substrate is at least partially positioned within the housing and at least partially extends through the opposing housing slots. A piezoelectric element is positioned on the bendable substrate and a weight cooperates with the bendable substrate. A stopper is positioned on each end of the bendable substrate that extends outside the housing; the stoppers are configured to maintain a portion of the bendable substrate within the housing such that the bendable substrate is freely movable within the housing. Vibrational energy causes collisions between the bendable substrate and the housing such that the forces on the piezoelectric element generate power.

18 Claims, 8 Drawing Sheets

FIG. 1   VIBRATION SOURCE

NON-RESONANT ENERGY HARVESTING DEVICES AND METHODS

FIELD OF THE INVENTION

The present invention relates to energy harvesting devices in general and, more particularly, to energy harvesting devices that can harvest energy over a range of frequencies, including non-resonant frequencies.

BACKGROUND

Vibration energy can be used to power a variety of devices such as sensors and transmitters that are located in hard-to-reach positions in apparatus such as vehicles and machinery. Such sensors and transmitters have been conventionally hard-wired or powered by batteries, but such power sources increase the complexity of the overall apparatus or require frequent maintenance (e.g., changing or recharging of batteries).

Although devices that generate power from vibration are known in the art, such devices typically are effective at a particular resonant frequency. However, the frequency of the vibration that will be generated by a particular apparatus is not always known in advance. Therefore, it is difficult to design a power-generating device that will work over the wide range of resonant frequencies that are encountered in different apparatus.

Various approaches to overcome the resonant frequency issue have been proposed. In U.S. Patent Application Publication 2007/0125176, plural energy harvesting devices, each having a different resonant frequency, are concatenated to provide a system that can produce power of a range of frequencies.

Similarly, U.S. Pat. No. 7,667,375 uses a group of harvesters each with a single resonance mode to create a device that can operate in a range of resonant frequencies to produce power.

Other approaches are designed to operate in a rotational environment such as the inside of a tire. Each rotation of the tire creates pulses of electrical charge. This approach is shown in U.S. Patent Application Publication 2007/0063621 and U.S. Patent Application Publication 2008/0258581.

However, most of the prior art approaches feature high quality factor systems where the quality factor, Q, is defined as:

$$Q=A/B$$

where B is the static deformation and A is the amplitude under the resonant mode. This limits the bandwidth in which the device can produce energy.

Thus there is a need in the art for improved energy harvesting devices which can operate in a broad range of frequencies to generate power.

SUMMARY OF THE INVENTION

The present invention relates to an energy harvesting device which can produce electrical power from vibrational energy over a wide range of frequencies. The energy harvester includes a housing having opposing slots. A bendable substrate is at least partially positioned within the housing and at least partially extends through the opposing housing slots. A piezoelectric element is positioned on the bendable substrate and a weight cooperates with the bendable substrate.

A stopper is positioned on each end of the bendable substrate that extends outside the housing; the stoppers are configured to maintain a portion of the bendable substrate within the housing such that the bendable substrate is freely movable within the housing. Vibrational energy causes collisions between the bendable substrate and the housing such that the forces on the piezoelectric element generate power.

DETAILED DESCRIPTION

Figure 1:
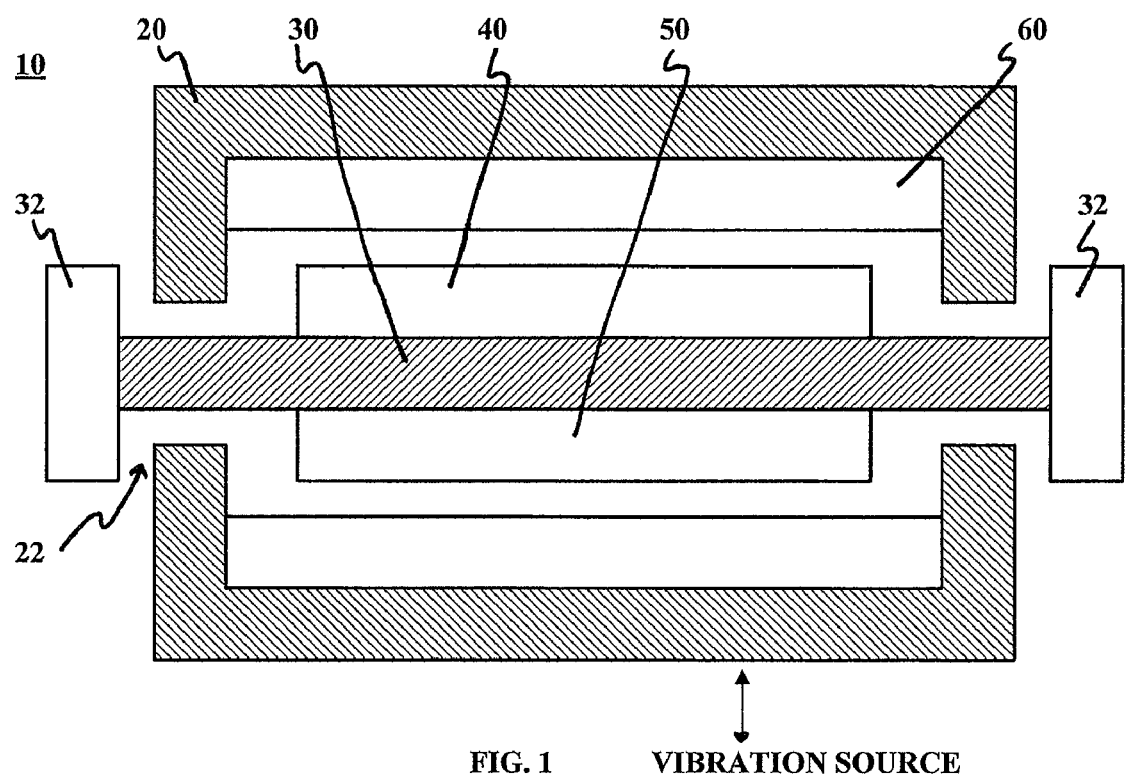
FIG. 1 schematically depicts a cross-sectional view of an energy harvesting device according to an embodiment of the present invention.

Turning now to the drawings in detail, FIG. 1 depicts a cross-sectional view of an energy harvester 10 according to one embodiment of the present invention. The harvester shape is not critical; it can be cylindrical, a rectangular parallelepiped, or any other three-dimensional shape that can accommodate the various harvester elements.

Harvester 10 includes housing 20 having opposing slots 22 formed therein. Extending from slots 22 is bendable substrate 30. To maintain bendable substrate 30 within housing 20, stoppers 32 are positioned adjacent either end of the substrate. Stoppers 32 are sized such that they are larger than housing slots 32. Therefore, even though the position of the bendable substrate is not fixed (that is, it is freely movable within housing 20), it cannot escape from the housing.

Depending upon the desired bending stiffness of bendable substrate 30, various materials are selected. Exemplary materials include, but are not limited to, bendable metallic materials such as copper alloys and stainless steel, and polymeric materials such as PVC. The bendable substrate has a slender, shim-like shape, with the selected thickness based on the selected material, the overall dimensions of the harvester and the desired bending stiffness of the bendable substrate. The desired bending stiffness is determined, in part, by the application environment of the harvester with strong vibration environments typically using a higher bending stiffness than weaker vibration environments.

On a first side of bendable substrate 30 is piezoelectric element 40. Piezoelectric element 40 may be selected from any piezoelectric material that produces sufficient electric power to run a selected device, such as a sensor. Suitable piezoelectric materials are typically piezo-ceramic materials such as lead zirconate titanate (PZT) and lanthanum-doped lead zirconate titanate (PLZT). An electrode pattern is coated on the outer surface piezoelectric element 40; the electrode material is selected from conductive materials such as gold, silver, nickel, and conductive polymers such as conductive epoxies. A variety of wire bonding techniques know in the art for use with electronics packaging may be used to attach leads to the electrodes. Attachment points are typically reinforced with materials such as epoxy resins to prevent fatigue of the wires and protect the joint between the wire and the electrode from damage or separation during harvester operation.

On the opposite side of bendable substrate 30 is deadweight 50. The momentum provided by weight 50 enhances the contacts and impacts of the bendable substrate 30 with housing 20. For example, if energy harvester 10 is positioned within a tire in order to power a pressure sensor, vibration plus the rotation of the tire causes bendable substrate 30 with piezoelectric element 40 and deadweight 50 to contact housing 20 and causes substrate 30 to impact the housing at the edges of the slots. When bendable substrate 30 bends, a force is applied to the attached piezoelectric element 40, resulting in power generation. Typically, the alternating current output is sent to a rectifier for conversion to direct current and stored in capacitors to power an associated device.

The energy harvester 10 is capable of frequency spectrum transformation due to the impacts between bendable substrate 30 and housing 20. The contact force caused by an impact is typically characterized by a sharp peak followed by oscillations. The design of harvester 10 results in even low frequency excitations causing the harvester to oscillate; these oscillations result in impacts between bendable substrate 30 and housing slots 22. Those impacts will introduce high frequency vibration excitations to the bendable substrate so that more energy will be generated by the piezoelectric element. This process is called "frequency spectrum transformation."

In the environment of a rotating tire, the vibration spectrum includes two components: a low frequency component from the rotation of the tire (typically less than 20 Hz and its energy increases with increasing vehicle speed) and a component from the random vibration of the tire. This latter component is white noise which is independent of vehicle speed. The design of harvester 10 permits both types of vibrational energy to be converted into electrical energy.

Figure 3:
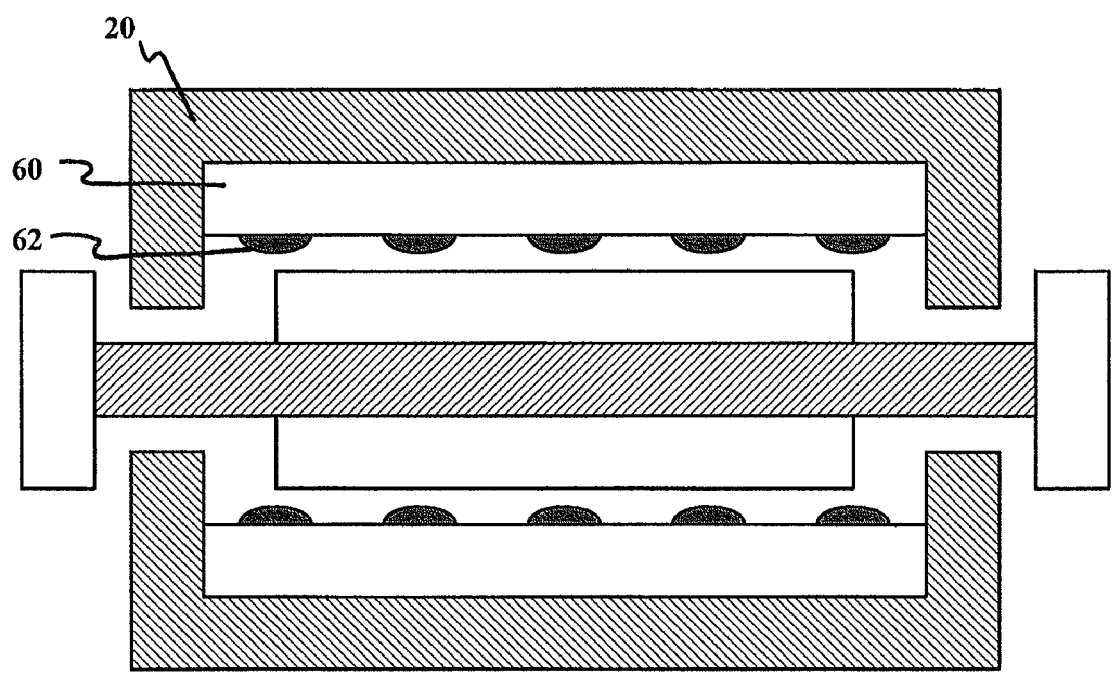
FIG. 3 depicts a housing modification that can be used with the energy harvesting device of FIG. 1.

In order to minimize the possibility of damage to piezoelectric element 40, housing stoppers 60 made from a resilient material such as an elastomeric polymer (e.g., rubber) can be optionally positioned in the housing 20. Housing stoppers 60 can include hemispherical portions 62 as seen in FIG. 3 to further cushion the contact between the substrate/piezoelectric element/deadweight structure and the housing.

Figure 2:
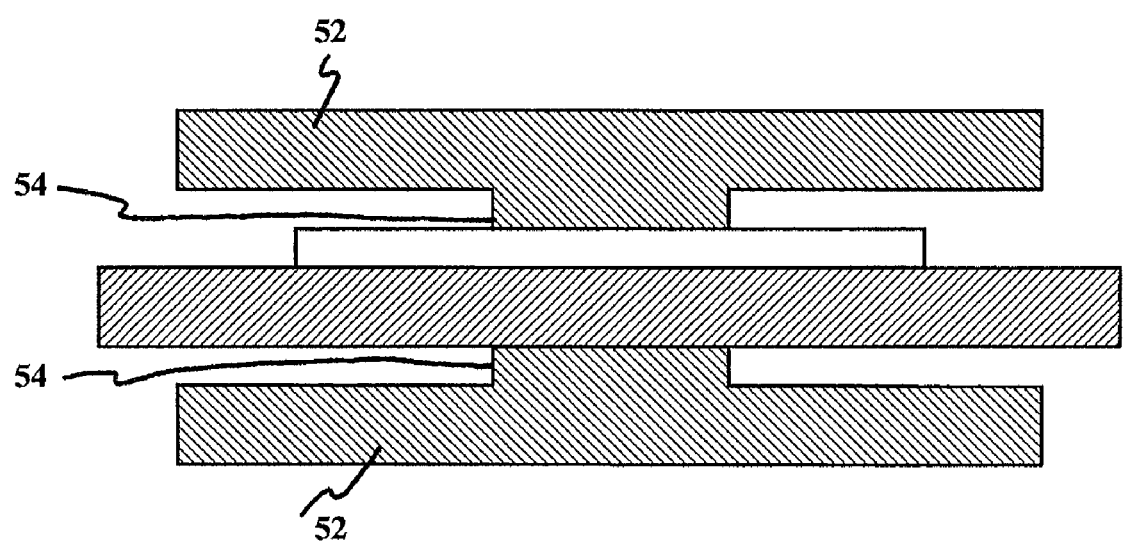
FIG. 2 shows a modification of bendable substrate and weight configuration usable with the energy harvesting devices of the present invention.

To further protect the piezoelectric element 40, e.g., from over-deformation of substrate 30 and from direct contact with the housing 20 or housing stoppers 60, an alternate embodiment is depicted in FIG. 2. In the FIG. 2 embodiment, a pair of deadweights 52 are positioned on either side of bendable substrate 30, connected by a narrow connector 54 (thus providing minimum interference to the stiffness of bendable substrate 30).

Figure 5:
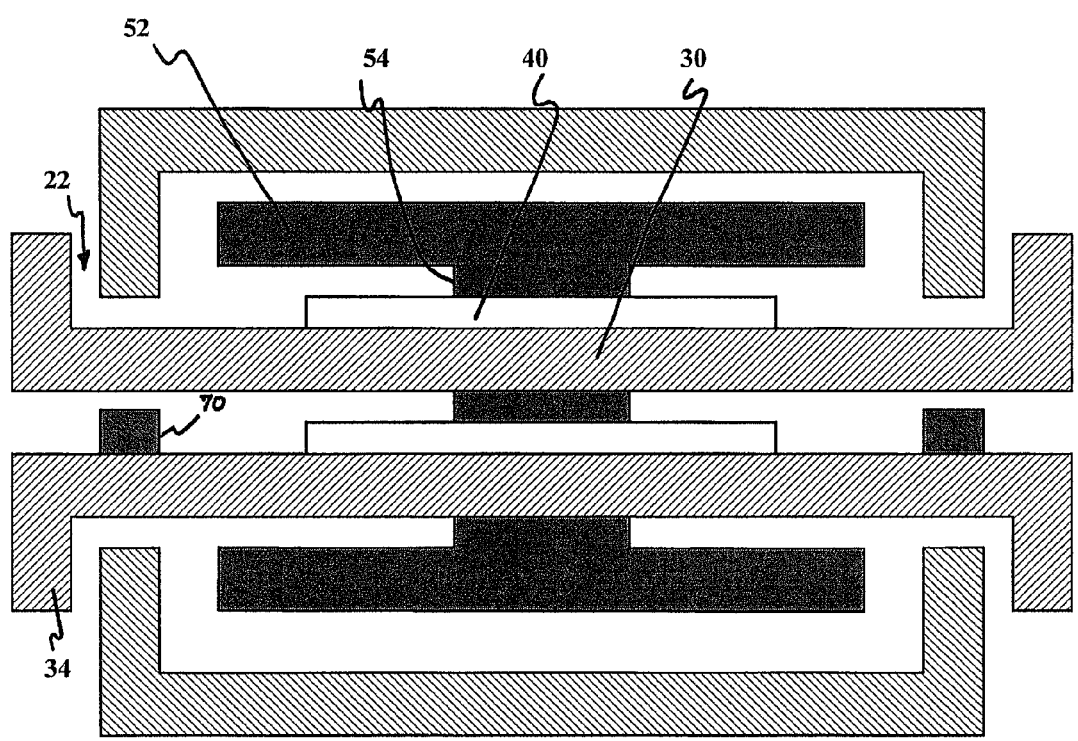
FIG. 5 depicts plural bendable substrates and weight configurations that can be used in the energy harvesters of the present invention.
Figure 6:
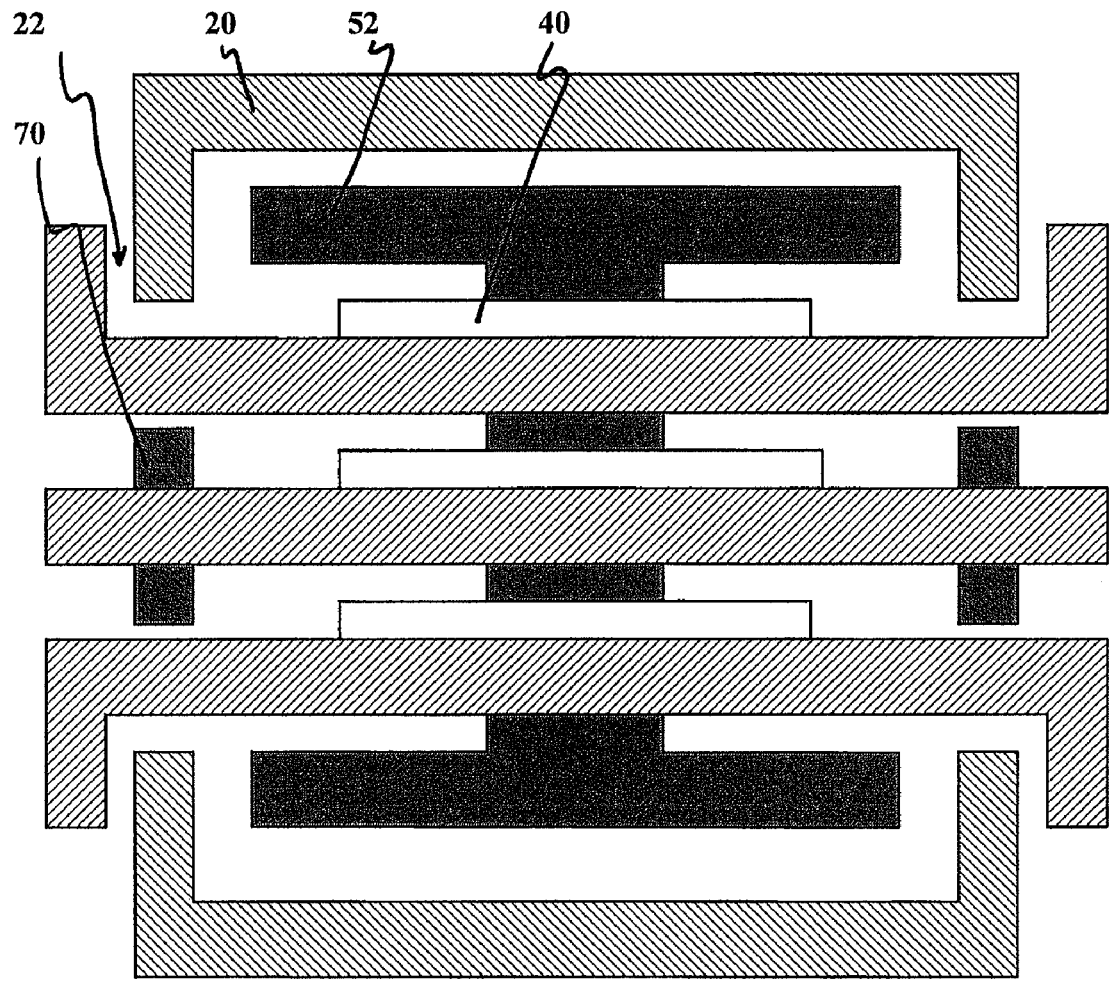
FIG. 6 depicts several bendable substrates and weight configurations that can be used in the energy harvesters of the present invention.

As shown in FIGS. 5 and 6, multiple bendable substrates 30 and piezoelectric layers 40 can be combined with deadweights 52 to increase the energy to be harvested from the device. The edges of bendable substrate 30 include projecting stoppers 34 (made from portions of the substrate itself or bonded to the substrate) to prevent the substrate from escaping from within housing 20 through housing slots 22. To reduce the overall bending stiffness of the structure, blocks 70 are each bonded to a single substrate 30 with sufficient clearance to permit relative motion of the bendable substrates 30. Blocks 70 are made from a material with low coefficient of friction or are covered with a material having a low coefficient of friction such as PTFE. The blocks provide additional impact points for the bendable substrates, contributing to the bending of bendable substrates 30. As the bendable substrates 30 with piezoelectric elements 40 are bonded together through connectors 54, they will deform in-phase, resulting in a compact device that produces more power than with a single bendable substrate/piezoelectric element and without the complexity and added weight of plural devices used together.

Figure 4:
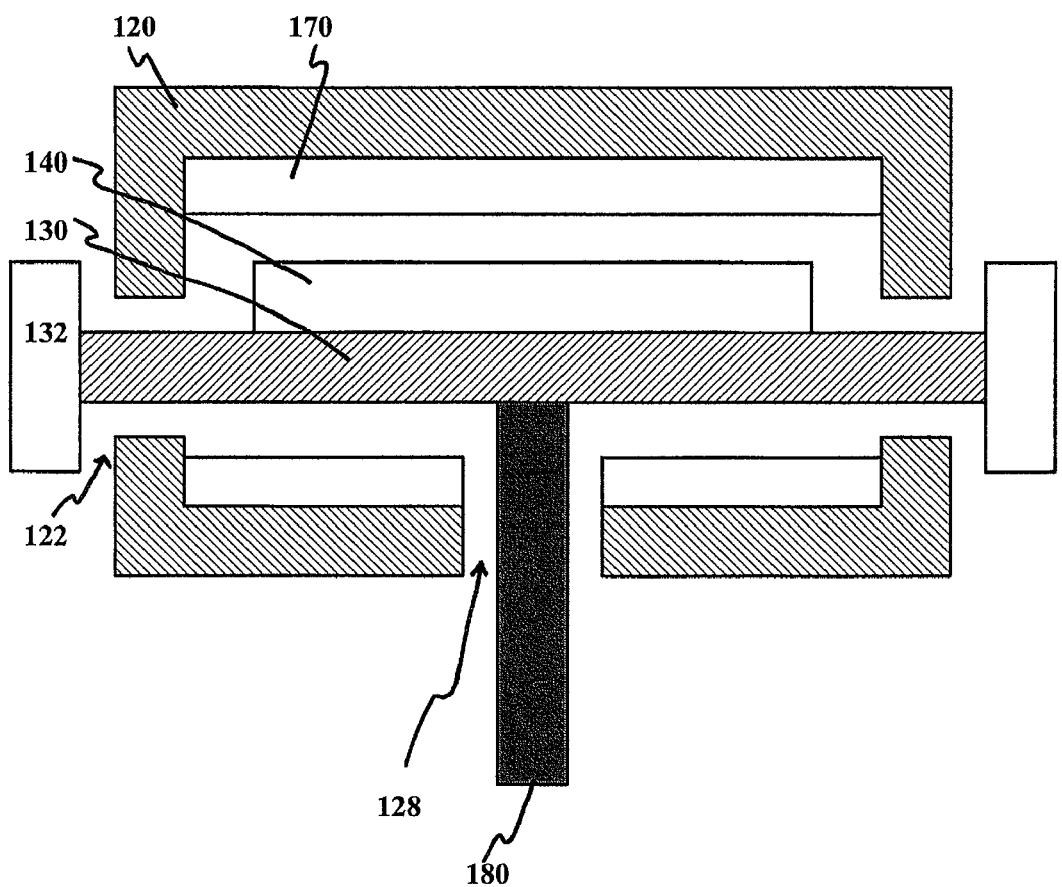
FIG. 4 schematically depicts an energy harvesting device according to another embodiment of the present invention.

As seen in FIG. 4, a vibration source may be directly connected to bendable substrate 130 via support rod 180. Here, housing 120 also acts as the deadweight such that relative motion between the housing and the bendable substrate 130 will deform the piezoelectric element 140 to generate power. Housing 120 includes slots 122 and deformable substrate 130 includes stoppers 132 to prevent escape from the housing. Housing further includes slot 128 to permit relative motion between the rod 180 and the housing 120. Stoppers 170 may optionally be included to cushion the contact between the housing and the bendable substrate/piezoelectric element combination. It is noted that multiple bendable substrate/piezoelectric material combinations can be bonded together as in FIGS. 5 and 6 to generate increased power. Using the housing as the weight can reduce the total weight of the energy harvester as well as reducing the overall dimensions of the energy harvester.

Figure 7A:
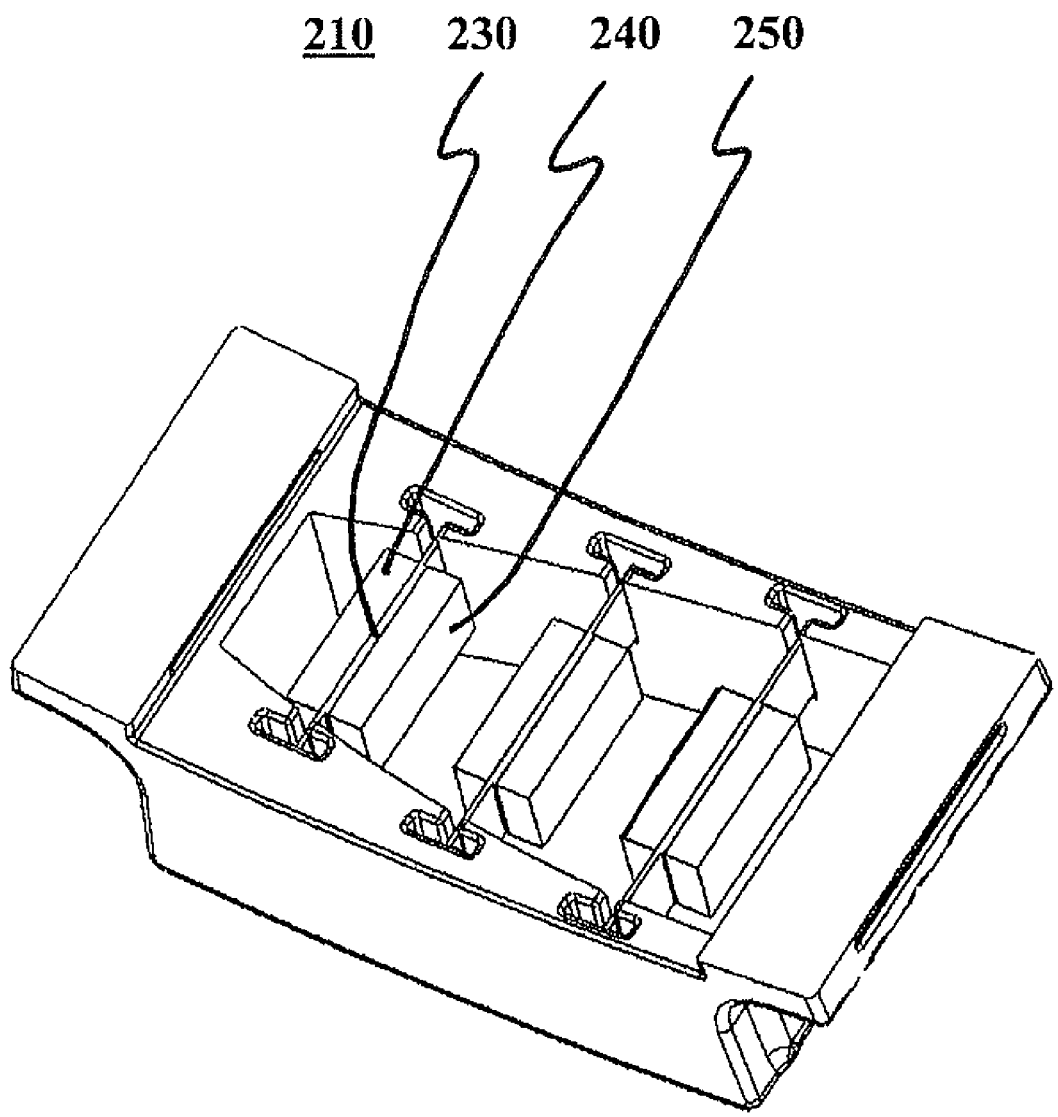
FIGS. 7A and 7B depict an embodiment of the harvester in which bendable substrates of different spans are supported in a housing.
Figure 7B:
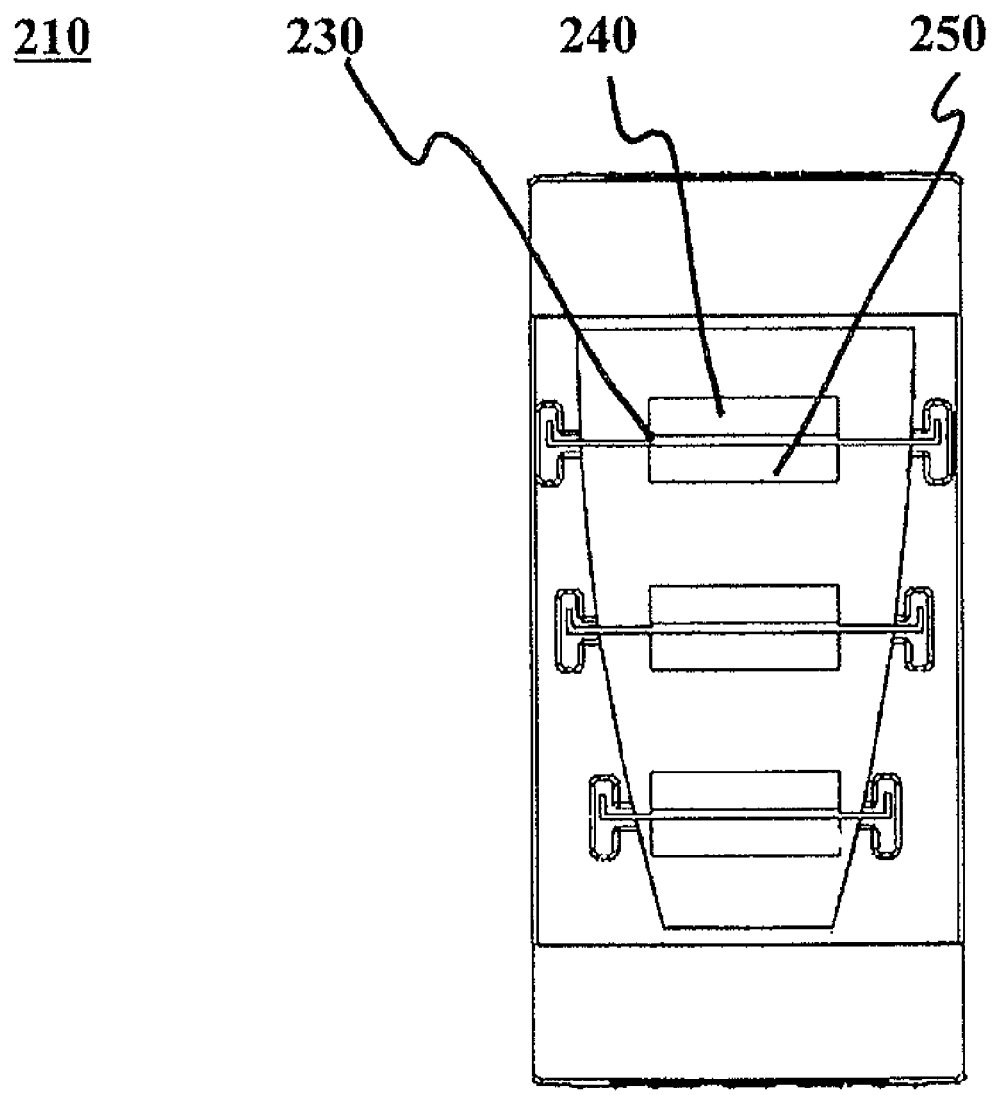

FIGS. 7A and 7B depict an energy harvester 210 in which plural bendable substrates 230 are provided, each bendable substrate having a different span width. By providing bendable substrates 230 with different span widths, the overall response frequency range of harvester 210 is increased. Note that although FIG. 7 depicts piezoelectric elements 240 and deadweights 250 attached to bendable substrates 230, the application of multiple span width substrates is not limited to this configuration. The use of multiple span width bendable substrates may also be used in embodiments in which the housing itself acts as the dead weight (as depicted in FIG. 4). Additionally, for each span width, multiple bendable substrates may be joined together as depicted in FIGS. 5 and 6.

The present invention is applicable in a variety of industrial applications. The energy harvester may be positioned within a rotating tire to power a pressure sensor which transmits tire pressure information to a receiver positioned remotely. For vehicle applications, such a receiver is positioned elsewhere on the vehicle such that tire pressure information can be viewed by the operator of the vehicle. However, the present invention is not limited to vibration sources which include rotation. For example, the energy harvesters may be used to power strain gauges on components in high vibration environments (e.g., aircraft wings, power equipment) such that the strain gauges transmit strain information to a monitoring location.

While the foregoing invention has been described with respect to various embodiments, it is understood that other embodiments are within the scope of the present invention as expressed in the following claims and their equivalents.

What is claimed is:
1. An energy harvesting device comprising:
a housing having opposing slots;
a bendable substrate at least partially positioned within the housing and at least partially extending through the opposing slots;
a piezoelectric element positioned on the bendable substrate;
a deadweight cooperating with the bendable substrate; and
a stopper positioned on each end of the bendable substrate that extends outside the housing, the stoppers configured to maintain a portion of the bendable substrate within the housing such that the bendable substrate is freely movable within the housing wherein collisions between the bendable substrate and the housing cause the bendable substrate to bend along with the piezoelectric element to generate power.

2. The energy harvesting device according to claim 1, wherein the deadweight is attached to the bendable substrate.

3. The energy harvesting device according to claim 2, wherein a pair of deadweights is attached to either side of the bendable substrate through connectors.

4. The energy harvesting device according to claim 1, wherein the bendable substrate and piezoelectric element comprise a plurality of bendable substrates and piezoelectric elements bonded together.

5. The energy harvesting device according to claim 1, further comprising one or more housing stoppers positioned within the housing to cushion the collisions between the bendable substrate with piezoelectric element and the housing.

6. The energy harvesting device according to claim 1, wherein the stoppers are formed from bent portions of the bendable substrate.

7. The energy harvesting device according to claim 1, further comprising a support rod which connects the bendable substrate to a vibration source through an opening in the housing.

8. The energy harvesting device according to claim 1, further comprising a plurality of bendable substrates, each of the bendable substrates having a different span width.

9. An energy harvesting device comprising:
a housing having opposing slots;
a bendable substrate at least partially positioned within the housing and at least partially extending through the opposing slots;
a piezoelectric element positioned on the bendable substrate; and
a stopper positioned on each end of the bendable substrate that extends outside the housing, the stoppers configured to maintain a portion of the bendable substrate within the housing such that the bendable substrate is freely movable within the housing wherein collisions between the bendable substrate and the housing cause the bendable substrate to bend along with the piezoelectric element to generate power, wherein the housing acts as a deadweight for the energy harvesting device.

10. The energy harvesting device according to claim 9, further comprising a support rod which connects the bendable substrate to a vibration source through an opening in the housing.

11. The energy harvesting device according to claim 9, wherein the bendable substrate and piezoelectric element comprise a plurality of bendable substrates and piezoelectric elements bonded together.

12. The energy harvesting device according to claim 9, further comprising a plurality of bendable substrates, each of the bendable substrates having a different span width.

13. A method of harvesting vibrational energy to produce electrical energy comprising:
positioning the energy harvesting device of claim 1 in contact with a source of vibrational energy;
collecting electrical energy produced by the energy harvester; and
providing the collected electrical energy to a sensor to power the sensor.

14. The method of harvesting vibrational energy according to claim 13, wherein the source of vibrational energy is a rotating tire.

15. The method of harvesting vibrational energy according to claim 13, wherein the sensor is a tire pressure sensor.

16. A method of harvesting vibrational energy to produce electrical energy comprising:
positioning the energy harvesting device of claim 10 in contact with a source of vibrational energy;
collecting electrical energy produced by the energy harvester; and
providing the collected electrical energy to a sensor to power the sensor.

17. The method of harvesting vibrational energy according to claim 16, wherein the source of vibrational energy is a rotating tire.

18. The method of harvesting vibrational energy according to claim 17, wherein the sensor is a tire pressure sensor.

* * * * *